United States Patent
Ziarnik et al.

(10) Patent No.: US 10,175,993 B2
(45) Date of Patent: Jan. 8, 2019

(54) DEVICE CONFIGURATION PRIOR TO INITIALIZATION OF A SYSTEM

(71) Applicant: Hewlett-Packard Development Company, L.P., Houston, TX (US)

(72) Inventors: Gregory P Ziarnik, Houston, TX (US); Mark A Piwonka, Tomball, TX (US); Michael R Durham, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 178 days.

(21) Appl. No.: 15/024,475

(22) PCT Filed: Sep. 26, 2013

(86) PCT No.: PCT/US2013/061960
§ 371 (c)(1),
(2) Date: Mar. 24, 2016

(87) PCT Pub. No.: WO2015/047277
PCT Pub. Date: Apr. 2, 2015

(65) Prior Publication Data
US 2016/0216976 A1    Jul. 28, 2016

(51) Int. Cl.
*G06F 1/20* (2006.01)
*G06F 9/4401* (2018.01)
*G06F 1/32* (2006.01)

(52) U.S. Cl.
CPC .............. *G06F 9/4403* (2013.01); *G06F 1/20* (2013.01); *G06F 1/206* (2013.01); *G06F 1/3203* (2013.01); *G06F 1/3206* (2013.01); *G06F 9/4418* (2013.01)

(58) Field of Classification Search
CPC .......... G06F 9/4403; G06F 1/20; G06F 1/206; G06F 1/3203; G06F 9/4418; G06F 1/3206
See application file for complete search history.

(56) References Cited

U.S. PATENT DOCUMENTS

| | | |
|---|---|---|
| 5,581,284 A | 12/1996 | Hermanson |
| 6,219,742 B1 | 4/2001 | Stanley |
| 8,120,816 B2 | 2/2012 | Wu et al. |
| 8,340,120 B2 | 12/2012 | Balakavi et al. |
| 2002/0062455 A1 | 5/2002 | Lee |
| 2003/0233534 A1 | 12/2003 | Bernhard et al. |

(Continued)

FOREIGN PATENT DOCUMENTS

| | | |
|---|---|---|
| CN | 102388366 A | 3/2012 |
| CN | 102681864 A | 9/2012 |

(Continued)

OTHER PUBLICATIONS

Monte Mar et al., "An Architecture for a Configurable Mixed-Signal Device," IEEE Journal of Solid-State Circuits, vol. 38, No. 3, Mar. 2003, pp. 565-568, 4 pages.

*Primary Examiner* — Jaweed A Abbaszadeh
*Assistant Examiner* — Gayathri Sampath
(74) *Attorney, Agent, or Firm* — HP Inc. Patent Department

(57) ABSTRACT

Examples disclose a method, system, and computer readable media to configure a device within a computing system. The examples process configuration data when standby power is applied to the device. Additionally, the examples configure the device based on the configuration data, wherein the device is configured prior to initialization of the computing system.

16 Claims, 5 Drawing Sheets

(56) References Cited

U.S. PATENT DOCUMENTS

| | | |
|---|---|---|
| 2004/0215836 A1 | 10/2004 | Moore et al. |
| 2005/0251640 A1* | 11/2005 | Wheeler ............... G06F 9/4411 711/170 |
| 2005/0289332 A1 | 12/2005 | Rothman et al. |
| 2005/0289335 A1 | 12/2005 | Fajar |
| 2008/0091965 A1* | 4/2008 | Nychka ................ G06F 1/3203 713/323 |
| 2008/0250252 A1 | 10/2008 | Tasher et al. |
| 2008/0266343 A1 | 10/2008 | Borrell |
| 2010/0066779 A1 | 3/2010 | Gothait |
| 2010/0177134 A1 | 7/2010 | Heo |
| 2010/0268967 A1* | 10/2010 | Senda ................... G06F 21/575 713/193 |
| 2010/0306520 A1 | 12/2010 | Jeon et al. |
| 2010/0332896 A1 | 12/2010 | Wilson |
| 2011/0222079 A1 | 9/2011 | Bezenek et al. |
| 2012/0239919 A1* | 9/2012 | Lo .......................... G06F 1/181 713/2 |
| 2013/0054986 A1 | 2/2013 | Kim et al. |
| 2013/0080752 A1* | 3/2013 | Liao ..................... G06F 9/4403 713/1 |
| 2013/0124895 A1* | 5/2013 | Saha ........................ G06F 1/26 713/323 |
| 2013/0258574 A1* | 10/2013 | Pamley ................... G06F 1/206 361/679.31 |
| 2013/0278659 A1 | 10/2013 | Bayona et al. |
| 2014/0089707 A1* | 3/2014 | Jouin .................... G06F 1/3243 713/323 |

FOREIGN PATENT DOCUMENTS

| | | |
|---|---|---|
| EP | 0500281 | 8/1992 |
| EP | 2308683 | 4/2011 |
| JP | 2005-149225 | 6/2005 |
| KR | 2002-0031615 | 5/2002 |
| WO | WO-2012058421 A2 | 5/2012 |
| WO | WO-2013/062564 | 5/2013 |

* cited by examiner

DEVICE CONFIGURATION PRIOR TO INITIALIZATION OF A SYSTEM

BACKGROUND

A computing system may configure various electrical devices when the computing system is initialized. These configurations of the electrical devices may pertain to circuits, coding, and hardware functionality to affect the operations of the computing system.

BRIEF DESCRIPTION OF THE DRAWINGS

In the accompanying drawings, like numerals refer to like components or blocks. The following detailed description references the drawings, wherein.

DETAILED DESCRIPTION

Figure 1:
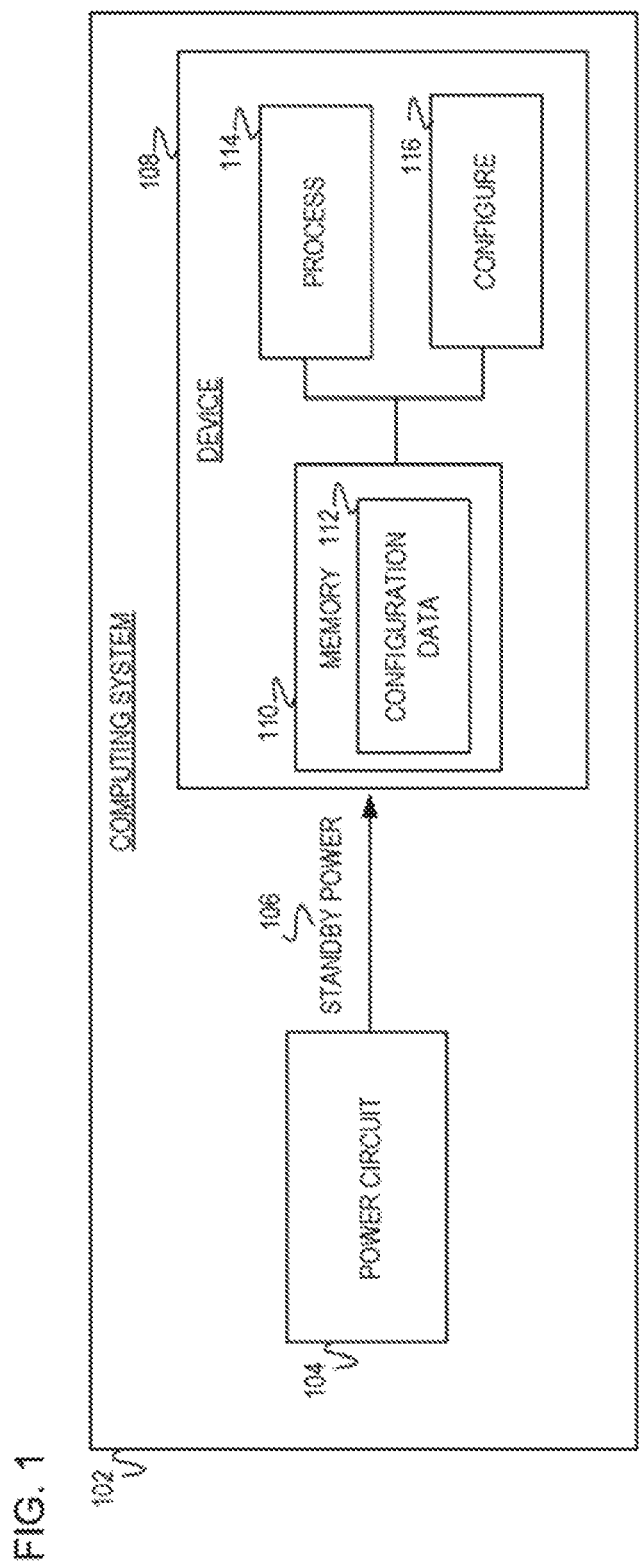
FIG. 1 is a block diagram of an example computing system including a power circuit to deliver standby power to a device, the device processes configuration data from a memory and configures itself based on the configuration data.

A computing system may configure its internal components upon an initialization of a basic input output system (BIOS). BIOS is a standard defining an interface through which electrical devices in the computing system may be configured. Configuration may pertain to coding, hardware components, and other documentation to affect the computing system function and performance. Electronic devices internal to the computing system may be designed in such a way that they have an appropriate configuration at initialization (e.g., booting up) of the computing system. These devices should default to a correct configuration or the computing system may not boot up. Additionally, if the devices are configured incorrectly, this may cause a contention between the incorrectly configured electrical devices and may cause latency in booting up the computing system and may also cause damage. For example, a pin which includes an electrical connection coming from the electrical device, may used exclusively for output, thus configuring the pin as input may cause the pin to not function or cause damage to the computing system. Additionally, the space of the device may be limited, thus using an additional dedicated pin to load a different configuration may not be feasible.

To address these issues, an implementation disclosed herein configures a device within a computing system prior to an initialization of the computing system. Applying standby power to the device, signals to the device to obtain configuration data within a memory. The device may then process this configuration data and configure itself based on this configuration data The device is configured prior to the initialization of the computing system. Configuring the device prior to the initialization of the commuting system reduces a latency associated with booting up the computing system as the device may already be configured upon initialization. Additionally, configuring the device prior to the initialization of the computing system, ensures the device is correctly configured for booting up the computing system.

In another implementation, a register internal to the device is programmed with a value corresponding to the configuration data in this implementation, the register may store the value which relates to a condition of a hardware component. This provides control and flexibility as the hardware component may be managed by the device through programming the register with the value. For example, each pin coming from the device may be configured through each register. Programming each register with a different value enables each pin to perform a different functionality. Further, this also allows the device to change functionalities of each pin. For example, one pin may include an input, another pin may include output, while yet another pin may operate as input and output. The device may change the functionalities of these pins on another configuration.

In a further implementation, the device may include a data table to identify the value based on the configuration data. Providing the data table with the value to program the register internal to the device provides an automatic configuration without user input. Configuring the device prior to initialization of the computing system based on the configuration data enables several variations of configurations across various devices. Additionally, programming a particular register with the value from the data table enables the device to be used in different computing system platforms, as the device may configure itself from the table rather than from a platform-specific interface. Further, this enables the device for use on multiple platforms, as opposed to each platform using a specific device to that platform. Furthermore, using the table to identify values for configuring the device removes a dedicated strapping pin which may be used to receive configuration data. This also saves space within the computing system as reducing a number of pins coming from the device.

In summary, implementations disclosed herein reduce latency associated with initializing a computing system. Additionally, the implementations disclosed herein enable the device for multiple configurations among various computing systems.

Referring now to the figures, FIG. 1 is a block diagram of an example computing system 102 including a power circuit 104 to deliver standby power 106 to a device 108. By applying the standby power 106, the device 108 may obtain configuration data 112 from an associated memory 110 and process the configuration data at module 114 for configuring the device log at module 116 The device 108 is configured prior to an initialization of the computing system 102 for booting up. Configuring the device 108 prior to the initialization of the computing system 102 removes latency associated with initializing the computing system as the device may already be configured upon initialization. The computing system 102 is an electronic device mat may be programmed to carry out a finite set of operations and as such may include a central processing unit (CPU) in addition to the device 108 and the power circuit 104. Implementations of the computing system 102 include a mobile device, a client device, personal computer, desktop computer, laptop, tablet, notebook, video game console, or other type of electronic device capable of executing various applications and carrying out operations. Additionally, although FIG. 1 illustrates the computing system 102 as including the power circuit 104 and the device 108, implementations should not be limited to this depiction as this was done for illustration purposes. For example, the computing system 102 may also include a motherboard and a central processing unit (CPU).

The power circuit 104 is a type of power processing circuit internal to the computing system 102 which applies the standby power 106 to the device 108. As such, the power circuit 104 may connect to an external power source (not illustrated), such as an alternating current (AC) power source to apply the standby power 106 to the device 108. The power circuit 104 may receive power from the external source and filter, convert, and/or condition the received power to obtain the standby power 106. In one implementation, the power circuit 104 may also deliver a main power in addition to the standby power 106 to the device 108. In another implementation, the power circuit 104 may be connected to the AC power source and include a low voltage rail to transmit the standby power 106 and a high voltage trail to transmit the main power lo the device 108. In this implementation, the computing system 102 may turn on (i.e., boot up), thus receiving a higher magnitude of power (e.g., the main power) on the high voltage rail. The main power initializes the computing system 102 for hooting up. The initialization of the computing system 102 may include the boot up or power on of the computing system 102 and as such, may include powering on the CPU and operating system for configuring the overall computing system 102. Implementations of the power circuit 104 include a power management circuit, converter, rectifier, power storage, power factor correcting circuit, circuit logic, amplifier, or other type of power circuit 104 capable of receiving an input power to obtain the standby power 106 for the delivery to the device 108.

The standby power 106 is an auxiliary power applied to the device 108 by the power circuit 104 when the computing system 102 is connected to the external power source. The standby power 106 operates as a signal to the device 108 lo read the configuration data 112 when the computing device is connected. In one implementation, once the computing system 102 is turned on (i.e., booted up). The power circuit 104 delivers the main power to the device 108 in addition to the standby power 106; however, if the computing system 102 is powered down, the standby power 106 remains for application to the device 108. In this implementation, when the computing system 102 is disconnected from the external power source, the standby power 106 is removed. Implementations of the standby power 106 include current, voltage, and/or other electrical charge capable of application to the device 108.

The device 108 is an intergrated circuit that may manage at least one hardware component and/or at least one particular use within the computing system 102 and as such, may include a controller, such as an I/O controller, for use in the computing system 102. The device 108 is used in addition to the CPU on the motherboard (not illustrated) of the computing system 102 in this implementation, the CPU manages the overall operation of the computing system 102 while the device 108 may mange at least one hardware component and/or manage one particular use of the computing system 102. In this regard, the device 108 may operate as an auxiliary processor while the CPU operates as the main processing unit. In another implementation, the device 108 may include a firmware-based device with machine-readable instructions executable by the device 108. In this implementation, the device 108 includes a firmware-based device, such as a super I/O, application-specific integrated circuit (ASIC) which may be customized for a specific purpose or particular use, rather than for general functioning of the computing system 102. The device 108 may operate with firmware (i.e., machine-readable instructions) stored in the memory 110 in addition to the configuration data 112. When the computing system 102 is connected to the external power source (but not yet turned on), the standby power 106 is applied so the device 108 may read the configuration data 112 from the memory 110. The device 108 uses the configuration data 112 to configure its pins, and program desired registers for initializations. Once the computing system 102 is turned on and receives the main power, the device 108 may already be configured and operating without a basic input/output interface or other type of interface to configure upon initializing the computing system 102. Although FIG. 1 illustrates the device 108 as including the memory 110 and modules 114-116 this was done for illustration purposes rather than limiting implementations. For example, the device 108 may also include a programmable register and/or port, etc. The programmable registers are written with values by the device 108 which correspond to the configuration data 112. The values written to the programmable registers indicate a functionality of the hardware component that corresponds to that programmable register. Implementations of the device 108 include the super I/O, integrated circuit, ASIC, auxiliary processor, auxiliary controller, embedded system, chipset microchip, semiconductor, or other type of electronic component capable of receiving the standby power 106 for configuration.

The memory 110 is a storage area internal to the device 108 which maintains the configuration data 112. In one implementation, the standby power 106 may energize the memory 110 for the device 108 to retrieve the configuration data 112. In another implementation, the memory 110 includes a non-volatile memory to maintain the configuration data 112. In a further implementation, the memory 110 may include a data table with values corresponding to the configuration data for the device 108 to program a register. Implementations of the memory 110 include a non-volatile memory, volatile memory, lash memory, local storage, storage area, memory butter, cache, random access memory (RAM), dynamic RAM, Electrically Erasable Programmable Read-Only memory (EEPROM), read-only memory (ROM), storage drive, or other storage area capable of maintaining the configuration data 112.

The configuration data 112 is a series of variables stored by the memory 110 for configuring the device 108. In this manner, the configuration data 112 instructs the device 108 how to configure itself. In one implementation, the configuration data 112 may include snapping data to define a location of the device 108 on a motherboard within the computing system 102. In this implementation, the computing system 102 may include multiple devices on multiple motherboards, thus the strapping data identifies the location of which device on which motherboard, etc. Additionally, the strapping data may be used to identify a particular configuration among multiple configurations for a particular device with a particular motherboard, etc. Including the strapping data as the configuration data 112 decreases a number of pins on the device 108 and reduces the overall space of the device 108 as a dedicated strapping pin to drive each type of configuration for the device 108 is removed. In another implementation, the configuration data 112 may include an identification of a particular register within the device 108. As such, the identification of the particular register may be used to determine the value in which to program that register. This implementation is described in detail in a later figure.

At module 114, the device 108 processes the configuration data 112 retrieved from the memory 110. Applying the standby power 106 to the device 108 signals to the device 108 to obtain the configuration data 112 for processing at module 114. In one implementation of module 114, the device 108 may utilize a data table or data structure to identify a value corresponding to the configuration data. Using the value from the data table, the device 108 may program a register to configure a hardware component that corresponds to the register. This implementation is discussed in detail in later figures. Implementations of the module 114 include a set of instructions, process, operation, logic, algorithm, technique, logical function, firmware, and/or software executable by the device 108 to process the configuration data 112.

At module 116, the device 108 is configured based on the configuration data 112 within the memory 110. In one implementation of module 116, the device 108 may write values to desired registers (not illustrated) to configure the device 108 within the computing system 102. By writing values 10 the desired registers within the device 108, enables the configuration of hardware components that correspond to the desired registers. The device 108 is configured at module 116 prior to the initialization of the computing system 102. The initialization of the computing system 102 may include booting up the CPU and/or the computing system 102. Implementations of the module 116 include a set of instructions, process, operation, logic, algorithm, technique, logical function, firmware, and/or software executable by the device 108 for configuring the device 108 based on the configuration data 112.

Figures 2A, 2B:
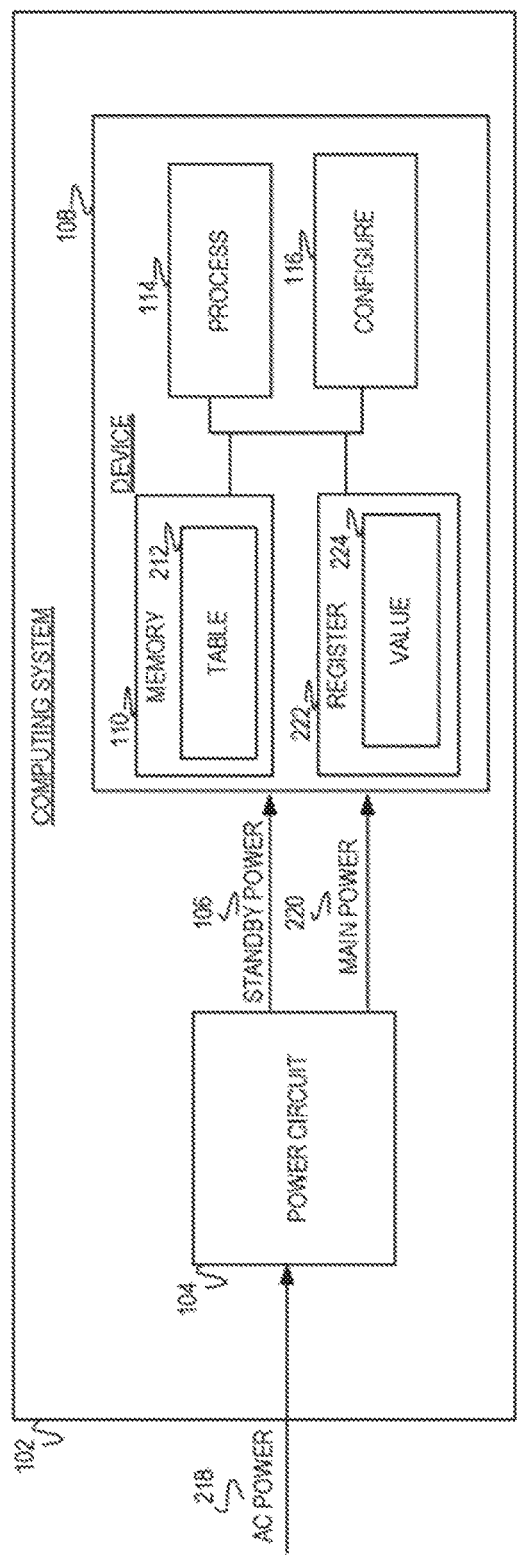
FIG. 2A is a diagram of an example computing system to receive alternating current (AC) power by a power circuit, the power circuit delivers standby power to configure a device prior to delivery of main power to the device.
FIG. 2B is a diagram of an example data structure including configuration data for a register internal to a device, the data structure includes a function of the register, an associated hardware, and a value in which to program a corresponding register.

FIG. 2A is a diagram of an example computing system 102 to receive input power and deliver standby power 106 to configure a device 108 prior to delivery of a main power 220 for initialization of the computing system 102. The device 108 may load configuration data when the computing system 102 may be connected to an external power source. During the connection of the computing system 102 to the external power source, the power circuit 104 may receive an alternating current (AC) power 218 and supply the standby power 106 to the device. This enables the device 108 to load a custom configuration prior to the computing system 102 turning on or booting up. Although throughout this application, examples of configuring hardware components such as pins and registers are illustrated and/or described, implementations should not be limited. For example, the configuration data may contain program code few the device 108 operation such as pin configuration; fan control, thermal protection, function enable/disable, internal/external device addresses, communication protocols; bus speed; communication bus width; debugging information, computing system capability data; programmable register values; and signal asserting timing.

The AC power 218 is an electrical charge provided to the power circuit 104 upon the computing system 102 connecting to the external power source (not illustrated). The power circuit 104 may control the amount of power delivered to the device 108. In one implementation, the AC power 218 is delivered continuously to the power circuit 104 while the computing system 102 is plugged into (i.e., connected) to the external power source. In this implementation, the power circuit 106 provides the standby power 106 even though the computing system 102 may not yet be initialized or tuned on.

The main power 220 is applied to the computing system 102 and the device 108 to initialize the overall functioning of the computing system 102. In one implementation, the power 220 is provided to a central processing unit (CPU) to initialize an operating system for the overall functioning of the computing system 102. In this implementation, a user may boot up the computing system 102 by initiating a power state of the power circuit 104 to deliver the main power 220. Implementations of the main power 220 include current, voltage, and/or other electrical charge capable of initializing the computing system 102.

The register 222 stores a bit of information (i.e., value) in such a way that the device 108 may read or write out the bit of information. The bit of information represents a condition of a hardware component internal to the computing system 102. In this implementation, the device 108 manages at least one of the hardware components (not illustrated) internal to the computing system 102. In this regard, the register 222 is a placeholder for information about the hardware functionality. The value 224 indicates a functionality of a hardware component associated with the register 222. In another implementation, the register 222 configures a thermal circuit through the configuration data. In this implementation, the thermal circuit is configured prior to the initialization of the computing system 102. Configuring the thermal circuit which may include a thermal sensor and/or a cooling fan prior to the initializing the computing system 102, may prevent damage or other type of thermal issues prior to the boot up of the computing system 102.

The value 224 is the bit of information programmed into the register 222 by the device 108. Using the configuration data, the value 224 may be identified using a data table or data structure as in FIG. 2B. Identifying the value 224 from the data table, enables the device 108 to program and/or write the value 224 to the register 222. Each value in FIG. 2B may represent a various functionality among the hardware components.

FIG. 2B is a diagram of an example data structure 212 including configuration data to identify a corresponding value. Applying a standby power to a device, the device may obtain the configuration data from a memory. The device may process the configuration data to identify the corresponding value, function, and/or hardware. The device uses the corresponding value, function, and/or hardware to program a register for hardware functionality. The device programs the register for the configuration prior to an initialization of a computing system. In one implementation, the data structure may include a table with the data to determine a corresponding value, function, and/or hardware given a particular register. In this implementation, the configuration data includes an identification of the particular register, so the device may identify the corresponding functioning, hardware, and/or value for configuration. For example, the configuration data stored in a memory of the device may identify one of the registers (REG 1, REG 2, REG 3), thus the device may process this configuration data to determine the corresponding value (0X02, 0X00, 0X01)

Each of the corresponding values (0X02, 0X00, 0X01) correlate to a hardware component (PIN, THERMAL, BUS WIDTH) and in which manner the hardware component is to function (OUTPUT, MONITOR, COMM). For example, the configuration data processed by the device may indentify register 1 (REG 1) which configures a pin associated with the device. In this example, the device may determine the corresponding value (0X02) which represents the pin is to operate as output In another example, the configuration data may identify register 2 (REG 2) which configures a thermal circuit internal to the computing system The device may then determine the corresponding value (0X00) which represents the thermal circuit is to monitor a thermal aspect of the computing system. In a further example, the configuration may identify register 3 (REG 3) which configures a bus width. The device may then determine the corresponding value (0X01) which represents the bus width is for communication. The values (0X02, 0X00, 0X01) are programmed into various internal registers to the device for configuration. Although FIG. 2B depicts the data structure with various registers (REG 1, REG 2, and REG. 3), hardware functions (OUTPUT, MONITOR, COMM), hardware components (PIN, THERMAL, BUS WIDTH), and corresponding values (0X02, 0X00, 0X01), this was done for illustration purposes rather than limiting implementations. For example, the registers may include multiple registers, the corresponding values may include binary values, the hardware functions may include additional functions such as enable/disable, input/output, and the hardware components may include additional components such as fan control, etc in another implementation, the configuration data may include strapping data which identifies a configuration among various configurations of the device. The strapping data may be used to identify a particular configuration for the device among multiple configurations. In this implementation, there may be multiple devices internal to the computing system, thus each device may include a different configuration. Additionally, this implementation enables the device for use among various platforms among various computing systems.

Figure 3:
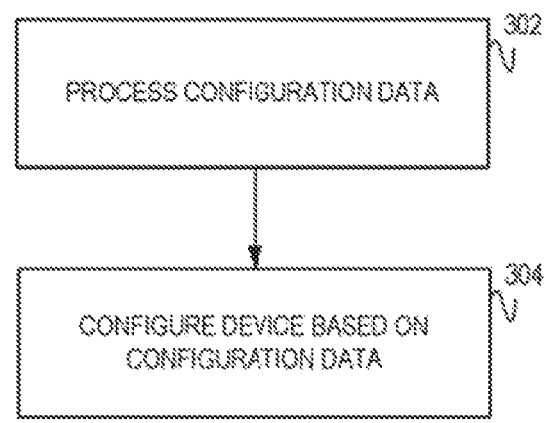
FIG. 3 is a flowchart of an example method to process configuration data and configure a device based on the configuration data prior to initialization of a computing system.

FIG. 3 is a flowchart of an example method to process configuration data and configure a device based on the configuration data prior to initialization of a computing system. The device is a firmware-based device which may include memory and program code stored in the memory, such as an embedded system. The firmware contained in the device are machine-readable instructions which provide the control program for the device and as such may be stored and/or maintained in a non-volatile memory associated with the device. The configuration data includes information which instructs the configuration of the device. The configuration data may reside in a memory associated with the device, so when standby power is applied to the device, the configuration data may be obtained. In one implementation, the configuration data may include identifying data which may correspond to a value within a data structure. In this implementation, the device may obtain the value from the data structure using the configuration data and program the value into a register associated with the device. The register may include information which may be programmed in such a way that it instructs the device how to use a hardware component associated with the register. For example, the register may be associated with pins on the device and as such, the value programmed into the register may include input, output, etc. Implementations of the register may include an electronic register, hardware register, and/or processor register. In another implementation, the configuration data may include strapping data which identifies the type of configuration for use with the device. In a further implementation, the configuration data may include a functionality of how the device is to operate. Configuring the device prior to the initialization of the computing system, enables the device to load the configuration data for booting up the computing system. This enables the device to load a custom configuration prior to the computing system power on. Additionally, this may decrease latency in booting up the computing system. In disclosing FIG. 3, references may be made to the components in FIGS. 1-2B to provide contextual examples. Further, although FIG. 3 is described as implemented by a device 108 as in FIG. 1, it may be executed on other suitable components. For example, FIG. 3 may be implemented in the form of executable instructions on a machine-readable storage medium, such as machine-readable storage medium 504 as in FIG. 5. In another example, FIG. 3 may be implemented by a processor associated with the computing system to manage functionality and configuration of the device 108.

At operation 302, the device may process configuration data obtained from the memory associated with the device when standby power is applied. At this operation, the device may be plugged into an alternating current (AC) source, but main power may not be applied yet. In this implementation, the computing system may be plugged into a wall outlet and receive AC current which in turn is applied to the device within the computing system. The main power may be received by the computing system when turned on. In this implementation, the standby power is a lower magnitude of current than the main power applied to the computing device. In this manner, the device may be configured from standby power prior to initializing the computing system with the main power. The standby power is a type of auxiliary power from which the device may read the configuration data from a flash memory of the device. This configuration data is used to configure the hardware internal to the computing system by programming the desired registers for initialization. Thus when the main power is applied and the computing system is initialized, the device may already be configured and operating properly without a basic input output system (BIOS) or other type configuration interface.

In another implementation of operation 302, the device uses configuration data to program a register internal to the device. The register configures a hardware component within the computing system that is associated with the device. For example, the register may include functioning of fans, thermal monitoring, pin configuration, thermal protection, etc. In this implementation, the value programmed into the register corresponds to the functioning of the hardware component. For example, the hardware component may include the pin configuration on the device, thus the value programmed into the register may indicate whether a particular pin may function as input, output, serial port, parallel port, etc. In a further implementation of operation 302, the device may process the configuration data in accordance with a data table. The configuration data may identify the particular register in which to program, thus the device uses the table to determine the value corresponding to the particular register in which to program that register. The value programmed into the register defines the functionality of the hardware component associated with the device.

At operation 304, the device is configured based on the configuration data processed at operation 305. The device is configured prior to applying the main power to the computing system for initialization. In this implementation, the device is configured prior to the computing system booting up. In another implementation, the thermal system of the computing system may be configured through registers internal to the device prior to applying the main power to the computing system for initialization. This reduces the reaction time of configuring the thermal system when experiencing issues from initialization. In a further implementation, upon processing operation 304, the method may proceed to applying the main power to the computing system for initialization.

Figure 4:
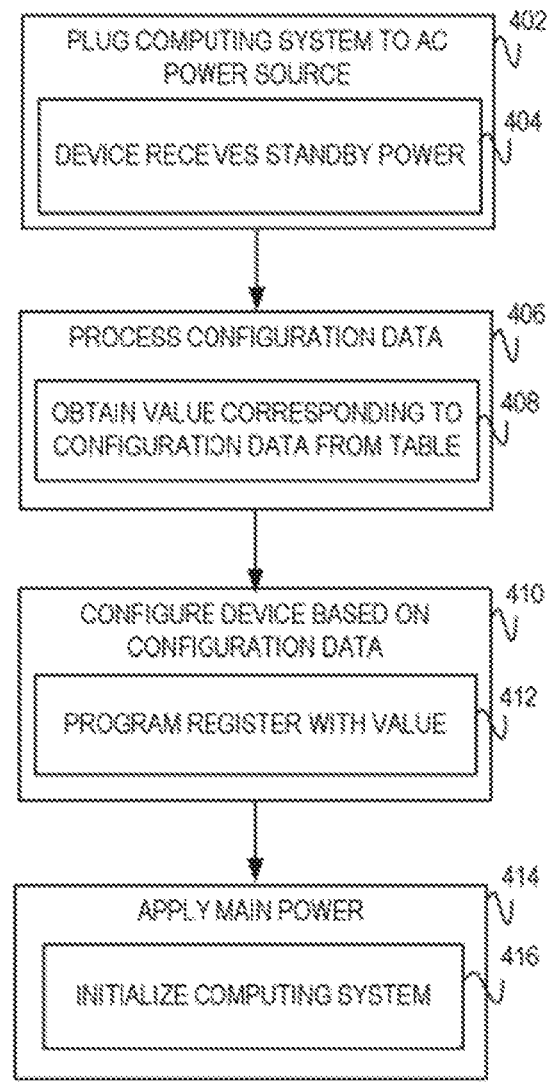
FIG. 4 is a flowchart of an example method to plug a computing system into an AC source to receive standby power to configure a device accordingly.

FIG. 4 is a flowchart of an example method to plug a computing system into an alternating current (AC) source to receive standby power and configure a device, accordingly. The device processes configuration data to obtain a value corresponding to the configuration data from a data table in a non-volatile memory of the device. The device may be configured with the value obtained from the data table by programming the internal register with the value. The configuration data may include an identification of a particular internal register, thus the table may include the configuration data to identify the particular internal register and the corresponding value to write into the particular internal register. Additionally, the configuration of the device occurs prior to applying a main power for initialization of the computing system. Programming each internal register with the value corresponding to the configuration data may control the functionality of each pin (i.e. electrical connection) and/or other hardware components thus providing flexibility to multiple different configurations of the device. In discussing FIG. 4, references may be made to the components in FIGS. 1-2B to provide contextual examples. Further, although FIG. 4 is described as implemented by a device 108 as in FIG. 1, it may be executed on other suitable components. For example, FIG. 4 may be implemented by a processor associated with the computing system to manage functionality and configuration of the device 108. In another example, FIG. 4 may be implemented in the form of executable instructions on a machine-readable storage medium, such as machine-readable storage medium 504 as in FIG. 5.

At operation 402, the computing system is plugged into the AC power source. The AC power source provides the flow of electrical charge to the computing system. The AC power source provides current to the computing system and in turn, the device. In one implementation, operation 402 may include conditioning the AC current from the AC power source into direct current (DC). The AC power source provides two different power rails to the computing system. These power rails include the standby power and a main power. The AC power source provides the standby power to the computing system and device on the lower powered rail when plugged into the AC source. The standby power is a lesser magnitude of power than the main power. In other words, the main power is a higher magnitude of power than the standby power. The main power is delivered on the higher powered rail to the computing system when the computing system is turned on and/or booted up. In this implementation, the standby power is a minimal amount of power applied to the device for configuration. The computing system includes the device as part of the system, thus the device may receive standby power as at operation 404 when the computing system is plugged into the AC source. In turn, when the computing system is unplugged from the AC source, the standby power is removed from the device.

At operation 404, the device receives the standby power when the computing system is plugged into the AC source as at operation 402. The standby power, as opposed to the main power, provides a standby current to the device when the computing system may be powered (e.g., plugged into the AC power source), but has not started up yet. In this implementation, the standby power is a lower magnitude of current than the main power applied at operation 414.

At operation 406, the device may obtain the configuration data from a memory and process the configuration data when the standby power received at operation 404 is applied to the device. In one implementation, the device may proceed to operation 408 upon processing the configuration data. Operation 406 may be similar in functionality to operation 302 as in FIG. 3.

At operation 408, the device may obtain a value from a table corresponding to the configuration data processed at operation 406. At this operation, the device may include a data table or other type of data structure and using the configuration data obtained from the memory at operation 406, the device may identify the value corresponding to the configuration data. The configuration data is a means for identifying the particular value within the table to program a register for a hardware configuration as at operation 412. For example, the configuration data may include identifying a location of the value in the data table or the particular register in which to program for the configuration of the device at operation 410. Obtaining the value from the table, enables the table to include multiple configurations for various devices as the table may be specific to the device. The configuration data may identify the particular register, thus using this identification, the table includes the value in which to program that particular register. The value programmed into the register defines the functionality of the corresponding hardware component.

At operation 410, the device may configure itself based on the configuration data obtained from the memory at operation 406. The device is configured prior to the application of the main power for initialization of the computing system as at operations 414-416. In one implementation, the device may obtain a value corresponding to the configuration data from a table as at operation 408. In another implementation, rather than utilizing the table to identify the value to configure the hardware component, the configuration data may instruct the device how to configure the hardware components within the computing system. Operation 410 may be similar in functionality to operation 304 as in FIG. 3.

At operation 412, the device may program an internal register with the value obtained at operation 408. Programming the internal register with the value, enables a hardware component that may be configured through that internal register with a functionality of the hardware component. For example, the device may include at least one internal register to configure the functionality of an electrical connection (i.e. pin) that consists of an electrical conductor from the device to other various components. In this example, the value programmed into the internal register indicates whether the pin is to function as input, output, input/output, etc. In this manner, the value obtained at operation 408 may indicate the functionality of the hardware component. In another implementation, the thermal system of the computing system may be configured by writing the value to the register corresponding to the thermal system. In this implementation, the thermal system may be configured prior to the application of the main power to initialize the computing system as at operations 414-416. Configuring the thermal system prior to the invalidation of the computing system reduces the reaction time from a detected issue upon the initialization of the computing system.

At operation 414, the computing system may turn on and apply a main power to a main processing unit (e.g., central processing unit) for the initialization of the computing system as at operation 456. The main power enables the operating system communicating with the main processing unit of the computing system to manage the overall functioning of the computing system. The main processing unit, also referred to as the central processing unit (CPU) is a hardware component within the computing system that performs the basic arithmetical, logical, and input/output operations of the system. In this implementation, the device may include an auxiliary processing unit to manage various hardware components within the computing system, while the CPU manages the overall functioning of the computing system. In another implementation, when the main power shuts down, but the computing system and/or device remains plugged into the AC source, the standby power as at operation 404 remains.

At operation 416, once applying the main power as at operation 404, the method proceeds to initialize the computing system. In this implementation, the central processing unit of the computing system may initialize to start powering on. Additionally, in this implementation the device configured at operation 410, unlike the central processing unit, is a firmware-based device that may manage the functionality of one of hardware components in the computing system. The firmware is machine-readable instructions and as such, is stored within the device in a non-volatile memory to provide the control program for the device.

Figure 5:
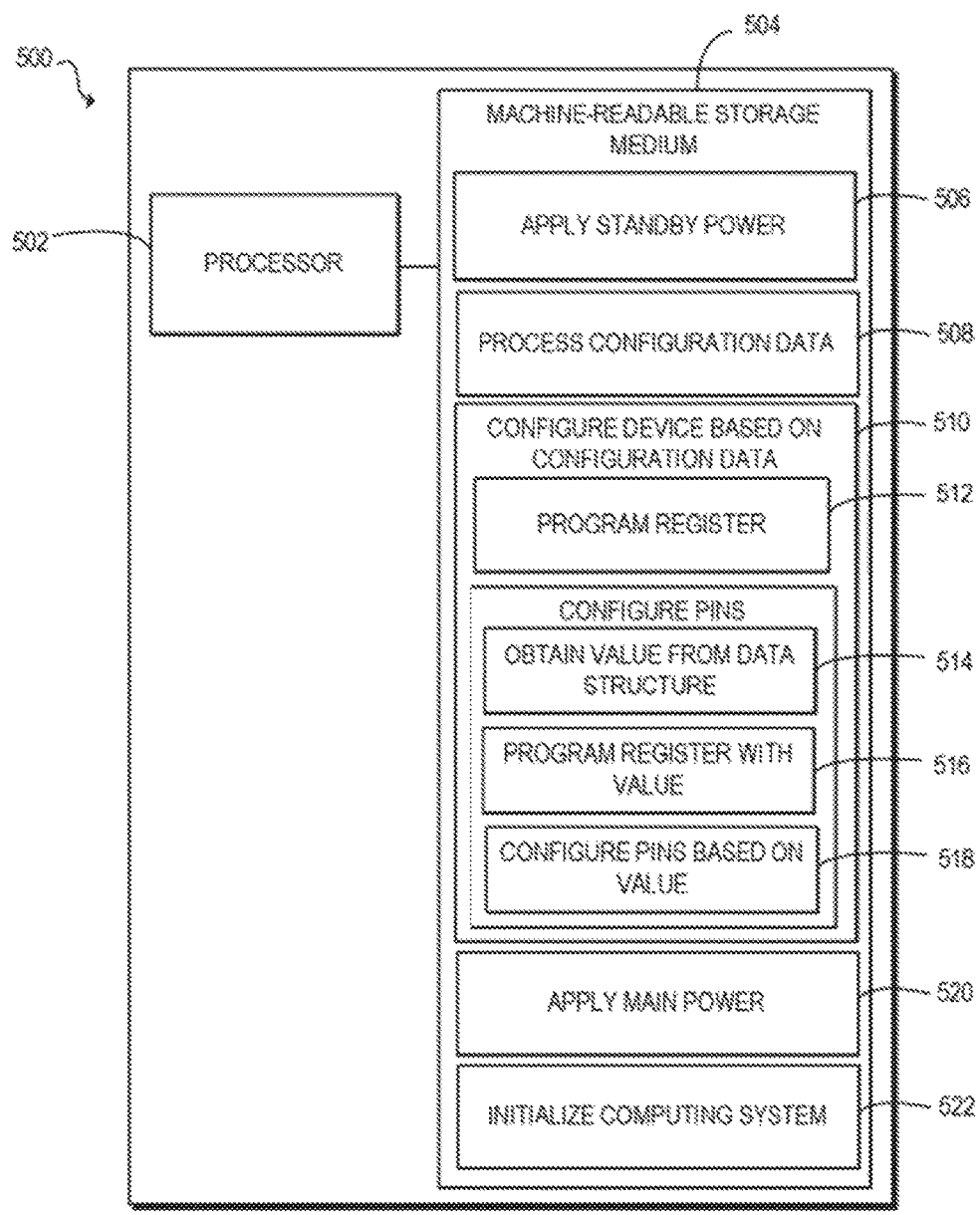
FIG. 5 is a flowchart of an example computing device with a processor to execute instructions in a machine-readable storage medium for applying a standby power to a device, processing configuration data, and configuring a device based on the configuration data prior to applying a main power to the device.

FIG. 5 is a block diagram of an example computing device 500 with a processor 502 to execute instructions 506-522 within a machine-readable storage medium 504. Specifically, the computing device 500 with the processor 502 is to apply a standby power to a device, process configuration data, and configure the device based on the configuration data. The device is configured prior to applying a main power to the device and/or initializing a computing system associated with the device. Although the computing device 500 includes processor 502 and machine-readable storage medium 504, it may also include other components that would be suitable to one skilled in the art. For example, the computing device 500 may include the power circuit 104 and/or memory 110 as in FIG. 1. The computing device 500 is an electronic device with the processor 502 capable of executing instructions 506-522, and as such, embodiments of the computing device 500 include a mobile device, client device personal computer, desktop computer, laptop, tablet, video game console, or other type of electronic device capable of executing instructions 506-522. The instructions 506-522 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processor 502 may fetch, decode, and execute instructions 506-522 to apply standby power, process configuration data, and configure the device based on the configuration data prior to initialization of the computing system. In one implementation, upon executing instructions 506-512, the processor 502 may execute instructions 520 and/or 522. In another implementation, upon executing instructions 506-510, the processor 502 may execute instructions 514-518 and proceed to instructions 520 and/or 522. The processor 502 executes instructions 506-510 to: apply the standby power to the device within the computing system; process the configuration data obtained from the memory of the device, and configure the device based on the configuration data. The configuration of the device occurs prior to applying she main power to the computing system for the initialization of the computing system. The processor 502 may execute instruction 512 to program a register internal to the device with a value obtained from a table. In an alternative to instruction 512, the processor 502 may execute instructions 514-518 to configure pins associated with the device, instructions 514-518 include: obtain a value from a data structure, program the register internal to the device the value obtained from the data structure; and configure the pins associated with the device based on the value programmed into the register. The processor 502 may proceed to execute instructions 520-522 to apply the main power to the computing device, the main power may also be applied to the device, and initializing the computing system from the application of the main power. Implementations of the processor 502 may include an integrated circuit, a microchip, processor, chipset, electronic circuit, microprocessor, semiconductor, microcontroller, central processing unit (CPU), graphics processing unit (GPU), semiconductor, or other type of programmable device capable of executing instructions 506-522.

The machine-readable storage medium 504 includes instructions 506-522 for the processor 502 to fetch, decode, and execute In another embodiment, the machine-readable storage medium 504 may be an electronic, magnetic, optical, memory, storage, flash-drive, or other physical device that contains or stores executable instructions. Thus, the machine-readable storage medium 504 may include, for example. Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processor 502 to fetch, decode, and/or execute instructions of the machine-readable storage medium 504. The application and/or firmware may be stored on the machine-readable storage medium 504 and/or stored on another location of the computing device 500.

In summary, implementations disclosed herein reduce latency associated with initializing a computing system. Additionally, the implementations disclosed herein enable the device for multiple configurations among various computing systems.

We claim:

1. A computing system comprising:
a power circuit to transmit standby power to a device;
a memory associated with the device to maintain first configuration data associated with a first computing platform and second configuration data associated with a second computing platform; and
the device to, prior to initialization within the first computing platform:
process the first configuration data associated with the first computing platform from the memory once receiving the standby power, wherein processing the first configuration data includes:
programming a register internal to the device with a first value corresponding to the first configuration data;

identifying a hardware component associated with the register to associate with the corresponding first value of the first configuration data; and determining a first functionality of the hardware component associated with the corresponding first value of the first configuration data; and configure the device based on the first configuration data to be enabled in the first computing platform, and configure the device based on the second configuration data, prior to initialization within the second computing platform, to be enabled in the second computing platform, wherein the second configuration data is associated with a second functionality of the hardware component.

2. The computing system of claim 1, wherein: the hardware component includes a pin, or a fan.

3. The computing system of claim 1 wherein to initialize the computing system, the power circuit is further to transmit main power to the device.

4. The computing system of claim 1 further comprising:
the register to configure a thermal circuit through the first configuration data, wherein the thermal circuit is configured prior to the initialization of the computing system.

5. The computing system of claim 1 further comprising:
the hardware component to operate based upon the register internal to the device programmed with the first value corresponding to the first configuration data.

6. A non-transitory machine-readable storage medium encoded with instructions executable by a processor of a computing system, the storage medium comprising instructions to:
apply standby power to a device within the computing system;
process first configuration data associated with the first computing platform and second configuration data associated with a second computing platform of the device prior to initialization within the first computing platform, wherein processing the first configuration data includes:
programing a register internal to the device with a first value corresponding to the first configuration data;
identifying a hardware component associated with the register to associate with the corresponding first value of the first configuration data; and
determining a first functionality of the hardware component associated with the first corresponding value of the first configuration data; and
configure the device based on the first configuration data to be enabled in the first computing platform, and
configure the device based on the second configuration data, prior to initialization within the second computing platform, to be enabled in the second computing platform, wherein the second configuration data is associated with a second functionality of the hardware component.

7. The non-transitory machine-readable storage medium including the instructions of claim 6 wherein to configure the device based on the first configuration data the medium comprises further instructions to identify the first value based on the first configuration data using a data table.

8. The non-transitory machine-readable storage medium including the instructions of claim 7 wherein the register is programmed to configure at least one of the following: pins, thermal management, and cooling fans.

9. The non-transitory machine-readable storage medium including the instructions of claim 6 further comprising instructions to:
apply main power to the computing system; and
initialize the computing system.

10. The non-transitory machine-readable storage medium including the instructions of claim 6 wherein to configure the device based on the first configuration data the medium comprises further instructions to:
obtain the first value from a data structure;
program the register internal to the device with the first value; and
configure pins on the device based on the first value programmed in the register.

11. A method to configure a device within a computing system, the method comprising:
processing, prior to initialization within a first computing platform, first configuration data associated with the first computing platform and second configuration data associated with a second computing platform of the device when standby power is applied to the device, wherein processing the first configuration data includes:
programing a register internal to the device with a first value corresponding to the first configuration data;
identifying a hardware component associated with the register to associate with the corresponding first value of the first configuration data;
determining a first functionality of the hardware component associated with the corresponding first value of the first configuration data; and
configuring the device based on the first configuration data to be enabled in the first computing platform; and
configuring the device based on the second configuration data, prior to initialization within the second computing platform, to be enabled in the second computing platform, wherein the second configuration data is associated with a second functionality of the hardware component.

12. The method of claim 11 further comprising:
applying a main power to a main processing unit for the initialization of the computing system.

13. The method of claim 11 wherein processing the first configuration data further comprises:
obtaining the first value corresponding to the first configuration data from a table; and
programming the register internal to the device with the first value, wherein the first value indicates a functionality of the hardware associated with the register.

14. The method of claim 11 further comprising:
plugging the computing system to an alternating current (AC) power source to apply the standby power to the device.

15. The method of claim 13 wherein configuring the device further comprises using the table to obtain the first value by removing a dedicated strapping pin used to receive the first configuration data.

16. The non-transitory machine-readable storage medium including the instructions of claim 7, wherein the instructions executable by the processor to program the register comprises instructions executable by the processor to provide the data table with the first value to program the register with an automatic configuration without user input.

* * * * *

UNITED STATES PATENT AND TRADEMARK OFFICE
CERTIFICATE OF CORRECTION

PATENT NO. : 10,175,993 B2
APPLICATION NO. : 15/024475
DATED : January 8, 2019
INVENTOR(S) : Gregory Ziarnik et al.

Page 1 of 1

It is certified that error appears in the above-identified patent and that said Letters Patent is hereby corrected as shown below:

In the Drawings

Drawing sheet 4 of 5, FIG. 4, reference numeral 404, Line 1, delete "RECEVES" and insert -- RECEIVES --, therefor.

In the Claims

Column 14, Line 55, Claim 15, delete "claim 13" and insert -- claim 13, --, therefor.

Signed and Sealed this
Second Day of July, 2019

Andrei Iancu
*Director of the United States Patent and Trademark Office*